United States Patent [19]

Kinugasa

[11] Patent Number: 5,828,053
[45] Date of Patent: Oct. 27, 1998

[54] PORTABLE STORAGE MEDIUM AND PORTABLE STORAGE MEDIUM ISSUING SYSTEM

[75] Inventor: Hiroshi Kinugasa, Chiba-ken, Japan

[73] Assignee: Kabushiki Kaisha Toshiba, Kawasaki, Japan

[21] Appl. No.: 645,843

[22] Filed: May 14, 1996

[30] Foreign Application Priority Data

May 17, 1995 [JP] Japan .................................. 7-118092

[51] Int. Cl.$^6$ .............................. G06K 19/06; G06K 5/00
[52] U.S. Cl. .......................... 235/492; 235/487; 235/380
[58] Field of Search .................... 235/320, 379, 235/492, 486, 382, 487; 340/825.31–825.35

[56] References Cited

U.S. PATENT DOCUMENTS

| | | | |
|---|---|---|---|
| 4,734,568 | 3/1988 | Watanabe | 235/487 |
| 4,734,569 | 3/1988 | Kawana et al. | 235/487 |
| 4,853,522 | 8/1989 | Ogasawara | 235/380 |
| 4,855,578 | 8/1989 | Hirokawa et al. | 235/380 |
| 4,891,506 | 1/1990 | Yoshimatsu | 235/492 |
| 4,928,001 | 5/1990 | Masada | 235/380 |
| 4,983,816 | 1/1991 | Iijima | 235/492 |
| 4,985,615 | 1/1991 | Iijima | 235/492 |
| 5,384,454 | 1/1995 | Iiima | 235/492 |

*Primary Examiner*—Donald T. Hajec
*Assistant Examiner*—Thien Minh Le
*Attorney, Agent, or Firm*—Cushman Darby & Cushman IP Group of Pillsbury Madison & Sutro LLP

[57] ABSTRACT

A portable storage medium issuing system writes plural issuing data in storing regions in a portable storage medium. The system includes a first memory to store plural secret data, a second memory to collate input secret data with the secret data stored in the first memory and stores a secret data out of plural secret data, which is collated and agreed with the secret data stored in the first memory based on the collated result, a third memory to store the plural issuing data and secret data which has been set corresponding to each of plural issuing data and requires the collation before writing into the portable storage medium as collating conditions. The collating condition stored in the third memory is compared with the collated status stored in the second memory. When the collated status satisfies the collating condition based on the result of this comparison, the issuing data in which the collating condition has been set in the storing region is written in the portable storage medium.

8 Claims, 11 Drawing Sheets

FIG. 3

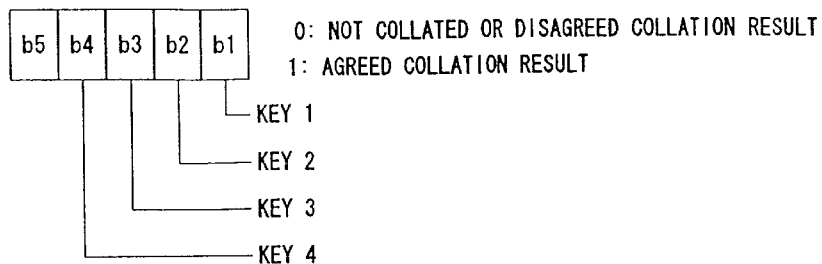

| b5 | b4 | b3 | b2 | b1 |

0: NOT COLLATED OR DISAGREED COLLATION RESULT
1: AGREED COLLATION RESULT

- b1 — KEY 1
- b2 — KEY 2
- b3 — KEY 3
- b4 — KEY 4

FIG. 4

| | | |
|---|---|---|
| 42(1) — | KEY 1 | KEY 2 — 42(2) |
| 42(3) — | KEY 3 | KEY 4 — 42(4) |
| 41(1) — | DEFINITION DATA a1 | COLLATING CONDITION b1 |
| 41(2) — | DEFINITION DATA a2 | COLLATING CONDITION b2 |
| 41(3) — | DEFINITION DATA a3 | COLLATING CONDITION b3 |
| | ⋮ | ⋮ |
| 41(n) — | DEFINITION DATA an | COLLATING CONDITION bn |
| 40(1) — | STORING REGION 1 | |
| 40(2) — | STORING REGION 2 | |
| 40(3) — | STORING REGION 3 | |
| | ⋮ | |
| 40(n) — | STORING REGION n | |

```
     *** ISSUING SYSTEM MENU ***
     1. FRAMING OF ISSUING DATA
     2. DISPLAY ISSUING DATA
     3. CARD ISSUE
     4. SUPPORT
     5. TERMINATION

PLEASE INPUT A NUMBER OF MENU: ___
```

FIG. 7A

| 1 | 0 | 1 | 1 |
|---|---|---|---|

KEY COLLATING CONDITION

FIG. 7B

| 0 | 0 | 1 | 1 |
|---|---|---|---|

KEY COLLATED STATUS

FIG. 8A

| 0 | 1 | 1 | 0 |
|---|---|---|---|

KEY COLLATING CONDITION

FIG. 8B

| 1 | 0 | 1 | 1 |
|---|---|---|---|

KEY COLLATED STATUS

FIG. 9A

| 0 | 1 | 0 | 1 |
|---|---|---|---|

KEY COLLATING CONDITION

FIG. 9B

| 0 | 1 | 1 | 0 |
|---|---|---|---|

KEY COLLATED STATUS

FIG. 11A

| 0 | 1 | 0 | 1 | 1 |
|---|---|---|---|---|

KEY COLLATING CONDITION

FIG. 11B

| 0 | 0 | 1 | 1 |
|---|---|---|---|

KEY COLLATED STATUS

FIG. 12A

| 0 | 0 | 1 | 1 | 0 |
|---|---|---|---|---|

KEY COLLATING CONDITION

FIG. 12B

| 0 | 0 | 1 | 1 |
|---|---|---|---|

KEY COLLATED STATUS

FIG. 13A

| 0 | 1 | 1 | 0 | 0 |
|---|---|---|---|---|

KEY COLLATING CONDITION

FIG. 13B

| 0 | 0 | 1 | 1 |
|---|---|---|---|

KEY COLLATED STATUS

FIG. 14A

| 1 | 0 | 1 | 0 | 1 |
|---|---|---|---|---|

KEY COLLATING CONDITION

FIG. 14B

| 1 | 0 | 1 | 1 |
|---|---|---|---|

KEY COLLATED STATUS

PORTABLE STORAGE MEDIUM AND PORTABLE STORAGE MEDIUM ISSUING SYSTEM

BACKGROUND OF THE INVENTION

1. Field of the Invention

The present invention relates to a portable storage medium with built-in memories for storing identification data, transaction data, personal historical data, etc. of individuals and a portable storage medium issuing system.

2. Description of the Related Art

As a portable storage medium, a so called IC card which has a built-in IC chip containing non-volatile data memories and CPU (Central Processing Unit) which controls these data memories has been used in various fields and its use has been expanded more and more in the recent years.

This kind of IC card is normally issued with required data written using a portable storage medium issuing system (an IC card issuing system) by card issuing companies.

Normally, a secret identification number of a card issuer has been set in an IC card issuing system and when issuing cards by writing issue data into cards, the secret identification number which has been set in an IC card issuing system is collated so that only a proper issuer is able to issue cards.

As disclosed in Japanese Patent Disclosure (Kokai) No. 63-56779, as an IC card issuing system, it is known such a system that is energized when a secret identification number set in the system is collated with a secret identification number stored in a key card that is for energizing an IC card issuing system and both secret numbers are agreed with each other, the IC card issuing system is energized, reads data from an IC card issuing data file and records this data on IC cards. By the way, IC cards are now used in various kinds of service fields such as cash card, credit card, prepaid card, identification card, etc. and a single IC card has become usable in multiple service fields in the recent years.

Service organizations for such IC cards which are usable in multiple service fields differ for every service field and it is desirable that issuing data that are recorded on IC cards are prepared by each service organization and IC cards are issued (recording data) by each service organization.

However, for service organizations to prepare issuing data originally, it is required for each of service organization to have a high level of knowledge regarding IC card and each organization has to equip a same IC card issuing system and there is a problem from a viewpoint of cost.

In general, therefore, a service organization, who is called a primary issuer and provides services that become the basis for cards and should first issue cards, will prepare issue data files by collecting data of individuals which are to be recorded on cards. This primary issuer executes the card issuing works for service organizations and issues cards by recording data of service organizations on IC cards at a time.

However, in a conventional IC card issuing system, only the collation of secret identification numbers is performed using a key card and nothing has been considered for the recording of data of various service organizations on IC cards at a time.

That is, when recording data of plural service organizations on IC cards using a conventional IC card issuing system, only by confirming the justifiability of a primary IC card issuer, issuing data for another service organization is read and recorded on an IC card and therefore, an independent security measure is not taken for issuing data for other service organizations. Thus, there was such a problem that cards may be illegally issued.

On the other hand, at the time when an IC card is manufactured, a memory built in that card is in the blank state and writing/reading are not protected.

So, as disclosed in Japanese Patent Publication (Kokoku) No. 4-21906, secret data for delivery to an issuer is stored in IC cards at the time when manufacturing the IC cards. There is a system that allows the writing of data only when this secrete data is collated and agreed.

There was, however, this system has such a problem that each storing region in which data of each service organization is stored is not independently protected in case of multi-purpose IC cards for storing data for plural service organizations and therefore, the illegal issue of IC cards cannot be prevented on the cards when IC cards are issued.

SUMMARY OF THE INVENTION

It is an object of the present invention to provide a portable storage medium issuing system which is capable of preventing the illegal issue of IC cards illegally using part of plural issuing data for writing in a portable storage medium.

It is further an object of the present invention to provide a portable storage medium which is capable of preventing illegal issue of IC cards by a portable storage medium itself, on which plural issuing data are recorded.

According to the present invention, a portable storage medium issuing system for writing plural issuing data in storing regions in a portable storage medium is provided. The system comprising means for storing plural secret data; first collating means for collating input secret data with the secret data stored in the storing means; collated result storage means for storing which secret data of plural secret data has been collated and agreed with secrete data stored in the storage means based on the collating result of the first collating means; collating condition storage means for storing plural issuing data and conditions of secret data, which are set corresponding to each of the plural issuing data and require the collation before writing into the portable storage medium, as collating conditions; comparing means for comparing the collating conditions stored in the collating condition storage means with the collated status stored in the collated result storage means; and writing means for writing issuing data in which this collating conditions are set in storing regions in the portable storage means when the collated status satisfies the collating conditions based on the result of comparison of the comparing means.

Further, according to the present invention, a portable storage medium which has plural storing regions in which plural issuing data are written is provided. The portable storage medium comprising storage means for storing plural secret data; collating means for collating input secret data with the secret data stored in the storage means; collated result storage means for storing which secret data out of plural secret data has been collated and agreed based on the result of collation of the collating means; collating condition storage means for storing secret data condition which has been set corresponding to each of the plural storing regions and requires the collation before writing into the storing region as the collating condition; comparing means for comparing the collating condition stored in the collating condition storage means with the collated status stored in the collated result storage means; and writing means for writing issuing data supplied from an issuing system into a storing region wherein the collating condition has been set when the collated status satisfies the collating condition based on the result of comparison of the comparing means.

BRIEF DESCRIPTION OF THE DRAWINGS

FIG. 3 is a diagram for explaining the key collating status;

FIG. 4 is a memory map showing a memory format in IC card;

FIG. 5 is a front view showing a menu picture of the IC card issuing system;

FIGS. 7A and 7B are diagrams for explaining the key collating conditions and the key collated status of Data 1;

FIGS. 8A and 8B are diagrams for explaining the key collating conditions and the key collated status of Data 2;

FIGS. 9A and 9B are diagrams for explaining the key collating conditions and the key collated status of Data 3;

FIGS. 11A and 11B are diagrams for explaining the key collating conditions and the key collated status of Data 1;

FIGS. 12A and 12B are diagrams for explaining the key collating conditions and the key collated status of Data 2;

FIGS. 13A and 13B are diagrams for explaining the key collating conditions and the key collated status of Data 3; and FIGS. 14A and 14B are diagrams for explaining the key collating conditions and the key collated status of Data n.

DETAILED DESCRIPTION OF THE PREFERRED EMBODIMENTS

A first embodiment of an IC card issuing system with the present invention applied will be described hereinafter referring to the attached drawings.

Figure 1:
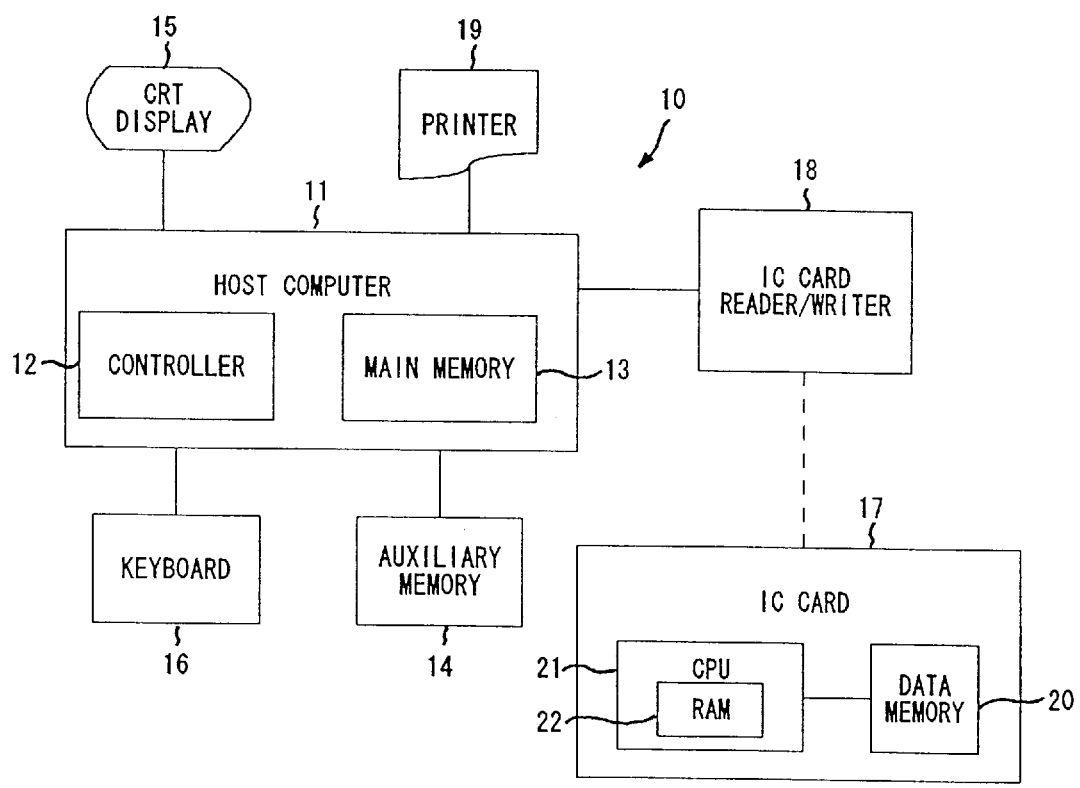
FIG. 1 is a block diagram showing an IC card issuing system of a present invention.

FIG. 1 is a block diagram showing the construction of an IC card issuing system. An IC card issuing system 10 has a host computer 11 which controls the entire system and this host computer 11 contains a controller 12 and a main memory storing a control program for controlling the IC card issuing system.

An auxiliary memory 14 contains an issuing data file which stores data required for issuing IC cards such as information pertaining to issuers, individual information on each card holder and information commonly applicable to card holders.

The host computer 11 has been connected with a CRT display 15 which informs operator of the menu of operating procedures menu and the status of the IC card issuing system, a keyboard 16 which serves as an input device for the operations based on the instructions shown on the CRT display 15, an IC card reader/writer 18 to read/write data on IC card 17, and a printer 19 to output and print date and time, issuing data file names, card numbers, number of cards issued as the issuing record of the IC card 17.

The main memory 13 of the host computer 11 stores keys (secret identification numbers) and retains the result of collation of keys (secret identification numbers).

The IC card reader/writer 18 connected to the host computer 11 is to write issuing data on the IC card 17 when the IC card 17 is inserted for issuing or read prescribed data out of the IC card 17 as necessary.

The IC card 17 has a built-in IC chip integrating a data memory 20 comprising such a non-volatile memory as EEPROM and a CPU 21 for controlling the data memory 20 on a single chip and the CPU 21 contains a RAM 22 for storing data temporarily.

Figure 2:
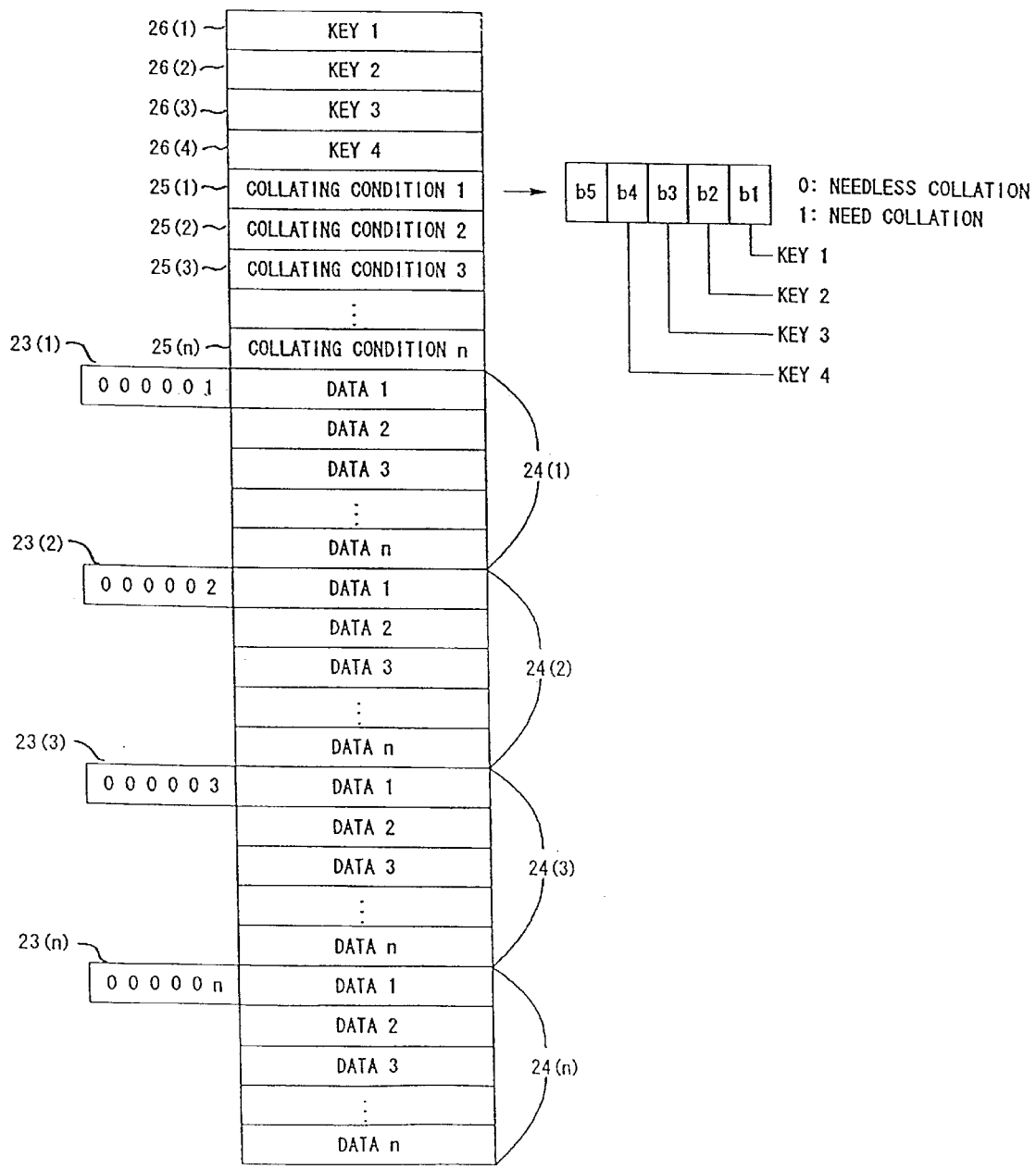
FIG. 2 is a memory map showing the construction of an issuing data file.
Figure 6A:
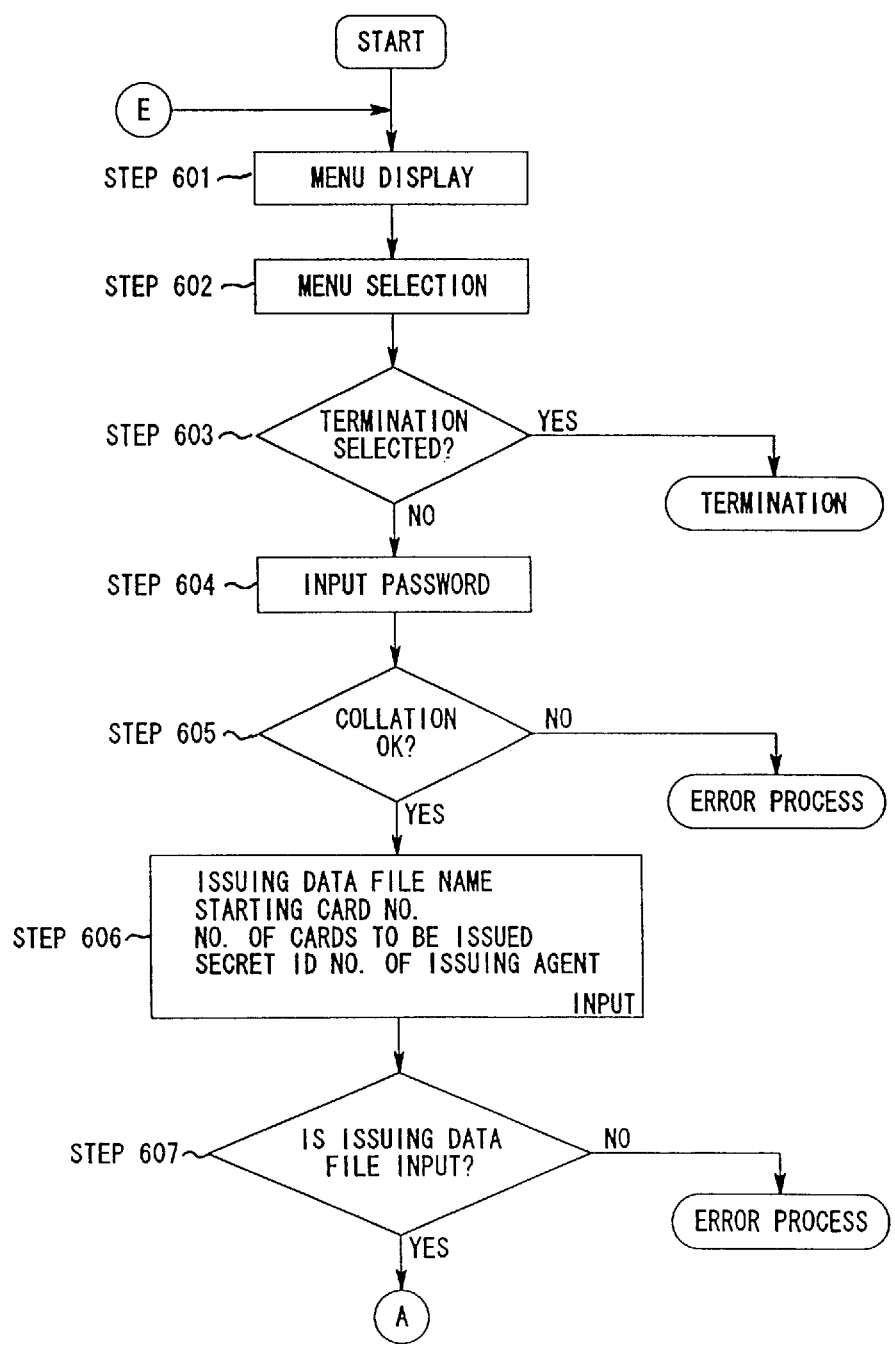
FIGS. 6A to 6E are a flowchart for explaining the operations of the IC card issuing system.
Figure 6B:
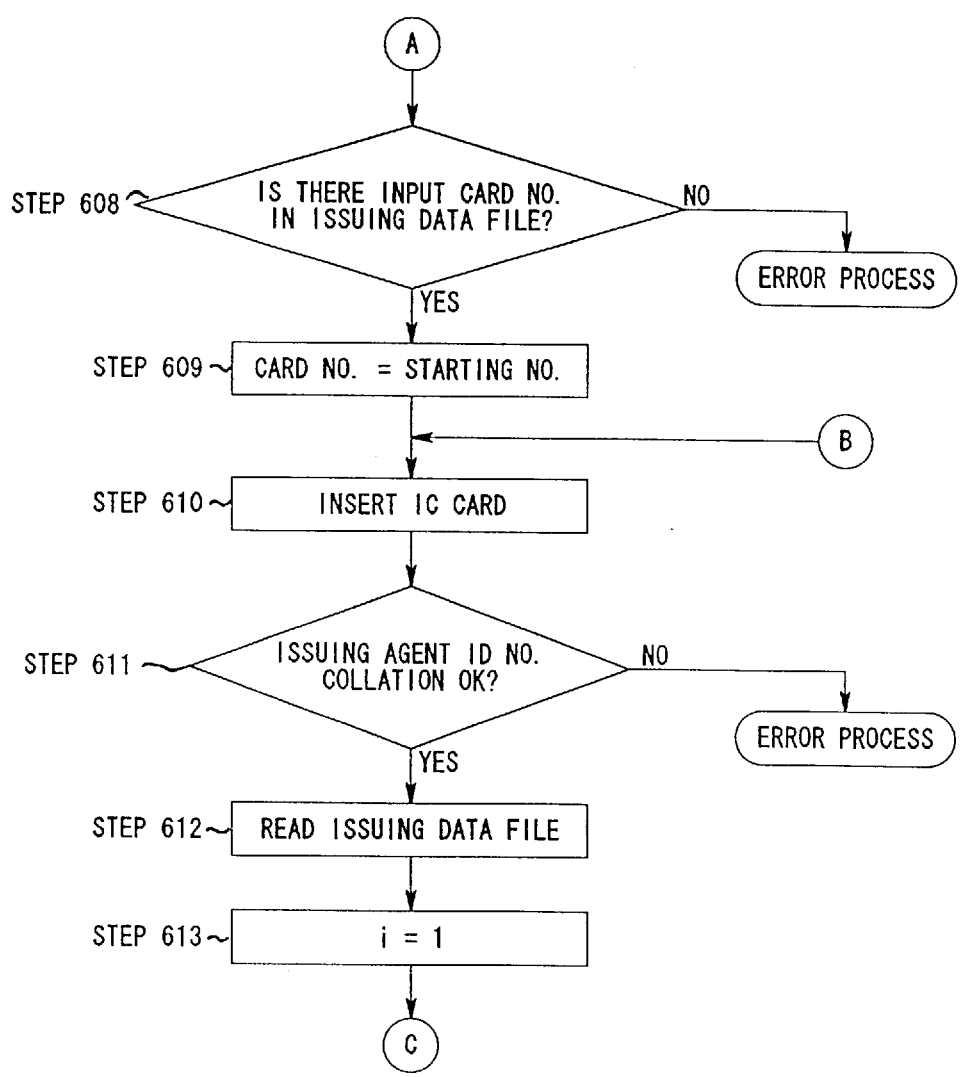
Figure 6C:
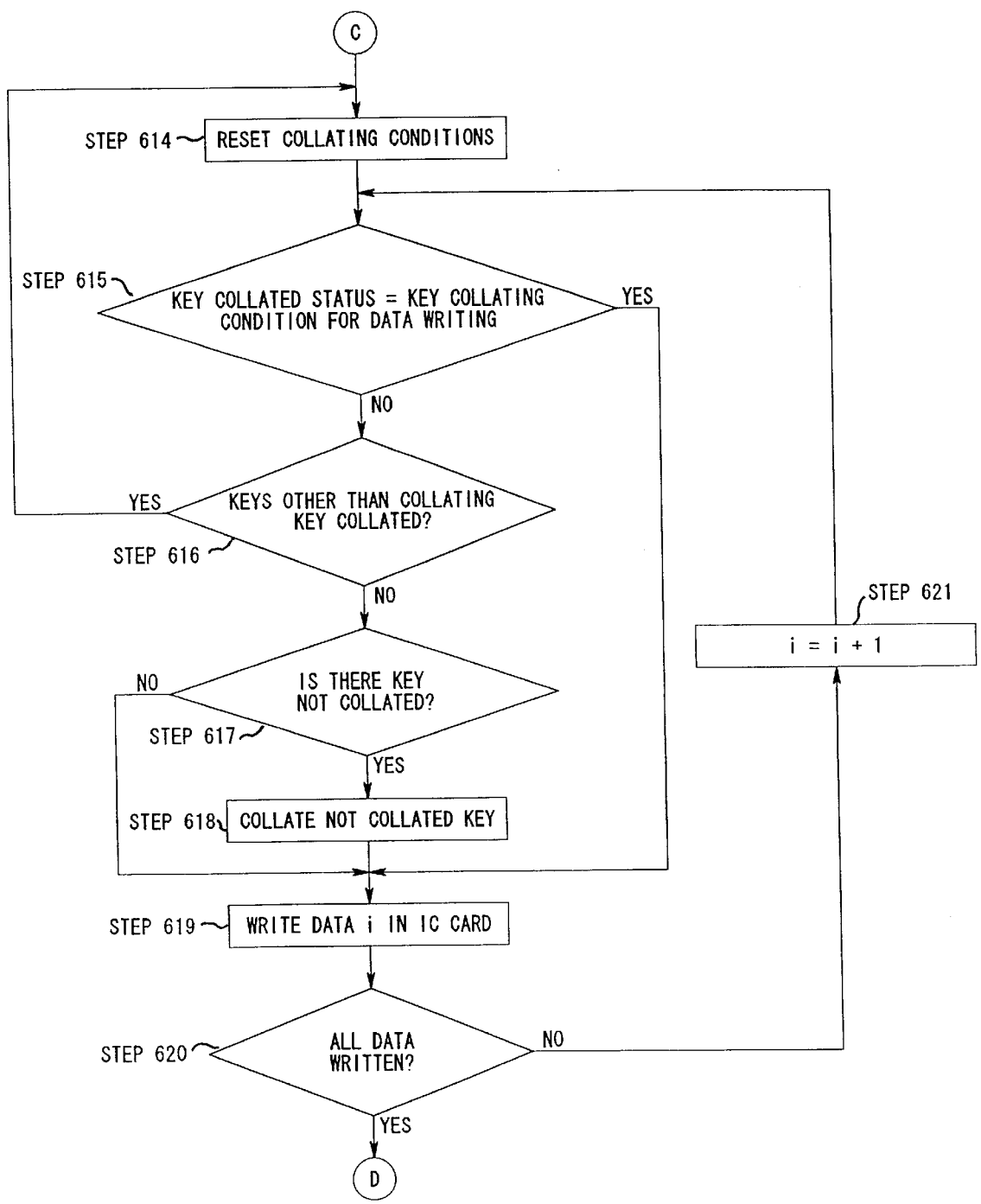
Figure 6D:
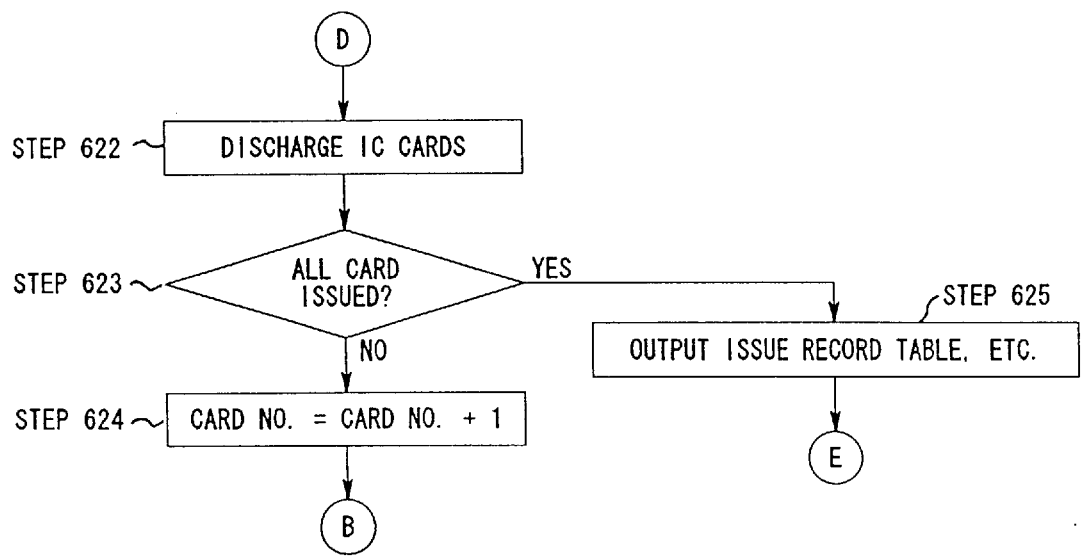
Figure 6E:
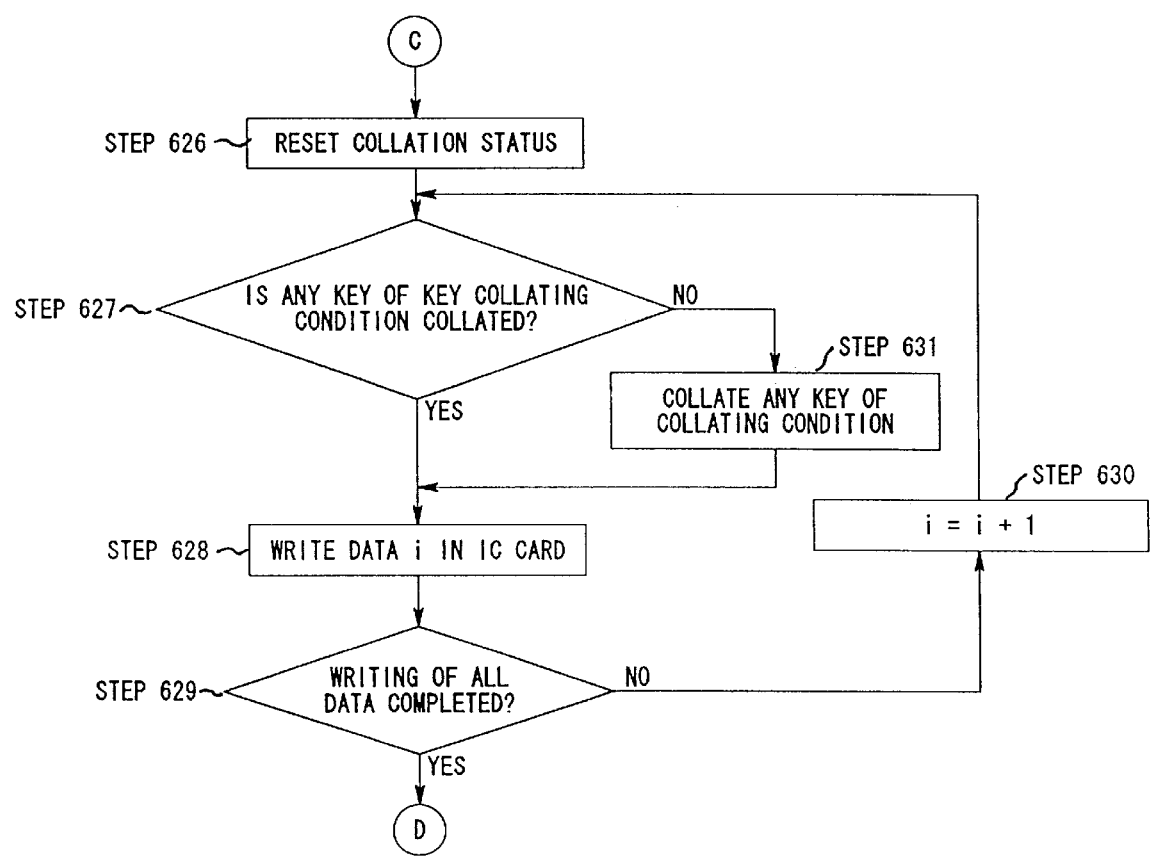

An issuing data file which is stored in the auxiliary memory 14 has such a format, for instance, as shown in FIG. 2.

The issuing data file is comprised of 6-byte card numbers 23(1) to 23(n) at the head, followed by issuing data groups 24(1) to 24(n) comprising data 1, data 2, ... data n, collating conditions 1(25(l)) to n(25(n)) and keys 1(26(1)) to 4(26(4)).

The data 1, data 2 to data n are data independent for each service of the IC card 17 such as prepaid cards, credit cards, etc. Further, the collating conditions 25(1) to 25(n) correspond to data 1 to data n, respectively and serve as the collating conditions for writing issuing data 1 to n in the IC card 17.

If 4 keys, for instance, Key 1 to Key 4 are provided, the collating conditions 25(1) to 25(n) show that the collation of which key of four keys, that is, Key 1 to Key 4 is required as the condition for writing issuing data in the IC card 17.

That is, the low order first bit (b1) of the collating conditions 25(1) to 25(n), the low order second bit (b2), the low order third bit (b3) and the low order fourth bit (4b) correspond to Key 1, Key 2, Key 3 and Key 4, respectively. When each bit is 1, it shows that the collation of corresponding key is required and if each bit is 0, it shows that the collation of corresponding keys is not required.

On the other hand, as shown in FIG. 3, in the main memory 13 of the host computer 11, the collated status of Key 1 through Key 4 have been stored in the form of, for instance, "0" which means not collated or disagreed collated result or in the form of "1" for the agreed collation result.

When the key collated status stored in the main memory 13 of the host computer 11 agreed with the collating conditions 25(1) to 25(n) for writing data in the IC card 17, the host computer 11 reads applicable issuing data 1 to n out of the auxiliary memory 14 and writes these issuing data in the IC card 17 through the IC card reader/writer 18.

On the other hand, a data memory 20 in the IC card 17 has a storing regions 40(1) to 40(n) in which data 1, data 2 to data n, which are issuing data, are stored as shown in FIG. 4 and these storing regions 40(1) to 40(n) serve as independent data storing regions for each service of the IC card 17 such as prepaid cards, credit cards, etc.

Further, directory data 41(1) to 41(n) comprising definition data (al) to (an) which are comprised of address, size, etc. of the storing regions 40(1) to 40(n) and key collating conditions (b1) to (bn) for data recording and reading in storing regions which are defined by these definition data are stored in the corresponding storing regions 40(1) to 40(n).

The collating conditions (b1) to (bn) of the directory data 41(1) to 41(n) are in the data format similar to the collating conditions 25(1) to 25(n) of the issuing file stored in the auxiliary memory 14 of the IC card issuing system as described above and have the similar meaning.

Further, key and directory data out of the keys 1 (42(1)) to 4 (42(4)) required for the IC card 17 have been stored in the data memory 20 in the IC card 17 before issuing the card. When a key collating command is received through the IC card reader/writer 18, the collation is made with the keys 1 to 4 and the result of collation is stored temporarily in the RAM 22 in the format shown in FIG. 3.

Then, when the key collated status stored in the RAM 22 agrees with the collating conditions 25(1) to 25(n) of the data memory 20 stored in the issuing data file in the auxiliary memory 14, the CPU in the IC card 17 writes the issuing data 1 to n received through the IC card reader/writer 18 in an applicable storing region of the data memory 20.

Next, the operation of the IC card issuing system 10 of the present invention in the construction described above will be explained referring to the flowchart shown in FIGS. 6A to 6E.

First, when the IC card issuing system 10 is energized, the menu picture is displayed on the CRT display 15 (STEP 601). The menu picture is in the structure as shown in FIG. 5.

When any menu is selected from this displayed menu picture (STEP 602), a series of processes corresponding to the selected menu are started.

When, for instance, "3. Card Issue" is selected (STEP 603), the card issuing process starts and a message requesting the input of a password is displayed on the CRT display 15.

Here, when operator inputs a password through the keyboard 16 (STEP 604), the host computer 11 collates this input password with a password stored in advance in the auxiliary memory 14 (STEP 605) and if both passwords agreed with each other, a message requesting the input of, for instance, an issuing data file name, a starting card number, the number of cards to be issued and a secret identification number of an issuer is displayed on the CRT display 15.

Here, when operator inputs these data through the keyboard 16 (STEP 606), the input data are stored in the main memory 13 of the host computer 11. Further, if both passwords did not agree with each other, the process returns to the menu picture.

The host computer 11 checks whether the issuing data file corresponding to the input issuing data file name has been stored in the auxiliary memory 14 (STEP 607) and if stored, checks whether the card numbers ranging from the input card number to the card number covering the number of cards to be issued exist in the issuing data file (STEP 608).

When the card numbers ranging from the input card number to the card number covering the number of cards to be issued exist in the issuing data file, the input card number is made as a starting number (STEP 609) and a message requesting insertion of the IC card 17 is displayed on the CRT display 15.

When operator inserts and sets IC cards 17 into the IC card reader/writer 18 for newly issuing according to this message (STEP 610), the host computer 11 reads keys 26(1) and 26(2) which were input and held in the auxiliary memory 14 in the preceding STEP 604 and sends them to the CPU 21 in the IC card 17 in order through the IC card reader/writer 18.

As a result, the CPU 21 in the IC card 17 collates the keys 26(1) and 26(2) sent from the host computer 11 with the keys stored in advance in the data memory 20 in order (STEP 611) and returns the result of this collation to the host computer 11 through the IC card reader/writer 18. Further, the result of collation is stored in the RAM 22 in the CPU 21.

At this time, when the secret identification numbers agreed with each other, the host computer 11 reads an issuing data file corresponding to the issuing data file name which was input through the keyboard 16 from the issuing data file stored in the auxiliary memory 14 and stored it in the main memory 13 of the host computer 11. Then, the host computer 11 sets a data count flag "i" to 1 (STEP 613).

Then, when sending a starting card number, for instance, "data 1" which is an issuing data belonging to the start number "000001" to the CPU 21 of the IC card 17 through the IC card reader/writer 18 and writing it into the data memory 20 by the CPU 21, the host computer 11 first resets the collating conditions stored in the main memory 13 (STEP 614).

Then, the host computer 11 confirms that the collating condition 25(1) for writing the data 1 into the data memory 20 by the CPU 21 has been satisfied.

That is, the key collating condition 25(1) for writing the data 1 was read from the auxiliary memory 14 together with the issuing data file and has been stored in the main memory 13. Further, as the current key collated status is stored in the main memory 13, the key collating condition 25(1) is compared with the key collated status and confirmed that they are in accord with each other (STEP 615).

The condition required for writing the issuing data 1 in the data memory 20 of the IC card 17 is the agreement with the collated state of Keys 1, 2 and 4 as shown in FIG. 7A.

When the key collated status before writing the issuing data 1 in the storing region 1 in the IC card 17 is such the status that the keys 1 and 2 have been collated as shown in FIG. 7B, to satisfy the condition for writing the issuing data 1, the collation of the key 4 is required and it is judged that the key 4 has not been collated (STEP 617).

Accordingly, when writing the issuing data 1 in the storing region 1 of the data memory 20 in the IC card 17, the key 4 (26(4)) stored in the auxiliary memory 14 is read and sent to the IC card 17. In the IC card 17, the input key (26(4)) is collated with the not collated key 4 (STEP 618). As a result of this collation, the key collated status stored in the RAM 22 is updated, the collated result is sent to the IC card issuing system 10 and the key collated status stored in the main memory 13 is updated.

Then, after satisfying the condition for writing the issuing data 1, the issuing data 1 is written in the storing region 1 (40(1)) of the data memory 20 in the IC card 17 (STEP 619).

After writing "Issuing Data 1" in the data memory 20, the host computer 11 checks whether all data (data 1 to data n) have been written (STEP 620) and if not, updates the data count flag "i" (STEP 621) and performs the same writing process until the writing of all data is completed.

That is, after recording the issuing data 1 in the IC card 17, the data count flag "1" is updated to "2" by "i=i+1" and the writing of the issuing data 2 is started.

The condition required for writing the issuing data 2 in the storing region 2 (40(2)) is the agreement with the collated status where the keys 2 and 3 have been collated as shown in FIG. 8A.

When the current key collated status is that status where the keys 1 and 2 have been collated as shown in FIG. 8B, it shows the collation of a key other than the required key (Key 1) and therefore, to satisfy the condition for writing the issuing data 2, all the key collated status is reset to the not collated status.

Then, the keys 2 and 3 are collated again in the same manner as above so as to satisfy the condition shown in FIG. 8A (STEP 618).

After the key collated status agreed and the condition for writing the issuing data 2 has been satisfied, the issuing data 2 is written in the storing region (40(2)) of the data memory 20 in the IC card 17 (STEP 619).

The condition required for writing the next issuing data 3 in the storing region 3 (40(3)) successively is the agreement with the status where the keys 1 and 3 have been collated as shown in FIG. 9A.

When the current key collating status is that status where the keys 2 and 3 have been collated as shown in FIG. 9B, all the key collated status are reset to the not collated status and the keys 1 and 3 are collated again so as to satisfy the condition shown in FIG. 9A (STEP 618).

After the key collated status agreed and the condition for writing the issuing data 3 has been satisfied, the issuing data 3 is written in the storing region 3 (40(3)) of the data memory 20 in the IC card 17 (STEP 619).

Thus, when the key collated status shows that required key has not been collated, the collation of the required key is performed and the agreement of the key collating condition with the key collated status is confirmed.

Further, when the key collated status shows the collation of other keys than the required key, the key collated status is reset and the key collation is performed again and it is confirmed that the key collating condition for writing data agrees with the key collated status.

On the other hand, in the IC card 17, the keys stored in the auxiliary memory 14 are received from the host computer 11 through the IC card reader/writer 18 and the CPU 21 in the IC card 17 collates a secret identification number of an issuer sent from the host computer 11 with the secret identification number of the issuer pre-stored in the data memory 20 (STEP 611) and the result of collation is stored in the RAM 22 in the CPU 21.

When receiving an issuing data writing command in STEP 619, the IC card 17 compares the collating conditions b1 to bn in the directory data 41(1) to 41(n) corresponding to the storing regions 40(1) to 40(n) into which the issuing data is written with the collated status stored in the RAM 22 to judge if the collating conditions b1 to bn are satisfied.

Then, when the collated status satisfy the collating conditions b1 to bn, the CPU 21 records the issuing data in the storing regions of the data memory 20.

Further, if the key collating status shows the collation with other keys than the required key when the collating conditions b1 to bn in the directory data 41(1) to 41(n) are compared with the collated status stored in the RAM 22, the CPU 21 resets the key collated status stored in the RAM 22.

Accordingly, the issuing data is not recorded in the storing region of the data memory 20 and after collating the key to satisfy the collating condition for writing the issuing data again, it becomes possible to write the issuing data in the storing region of the data memory 20 in the IC card 17.

When completing the writing of all data ranging up to data n belonging to the starting card number by the operation described above, the host computer 11 discharges the IC card 17 by sending a card discharging command to the IC card reader/writer 18 (STEP 622).

Then, the host computer 11 checks all IC cards 17 to be issued, which are input through the keyboard 16 and stored in the main memory 13, as to whether the issuing data have been written (STEP 623). If not completed, by incrementing the card number by one (STEP 624), returns to STEP 610.

Then, a message requesting the insertion of the IC card 17 of the incremented next card number "000002" is displayed on the CRT display and when this IC card 17 is inserted in the IC card reader/writer 18, the processes of STEPS 611 to 624 are repeated in the same manner as described above.

When completing the writing into of IC cards to be issued which were input in STEP 606, the host computer 11 operates the printer 19 to print and output date of card issue, an issuing data file name, card numbers of data issued and the number of cards issued, etc. (STEP 625), and returns the display on the CRT display 15 to the menu picture.

If the check becomes defective and an error occurs in the above checking processes, an error message is displayed on the CRT display 15 and the processes are terminated or interrupted.

According to the first embodiment described above, as the secrete data collating conditions for writing IC card issuing data on IC cards are set for each issuing data and the collated status with the collating conditions is confirmed in the IC card issuing system 10, it is possible to retain the independent secrecy for every issuing data and prevent illegal card issue.

In addition, as the collating condition of secret data for writing issuing data in an IC card is set corresponding to each of the storing regions of the data memory 20 of the IC card and the collating condition and the collated status are checked by an IC card itself, it becomes possible to protect the writing independently for each storing region of the IC card and prevent the illegal card issue on the card itself.

Furthermore, if the collated status required for writing data is retained as the collating conditions and the collated status are retained in the IC card issuing system 10, another collation becomes unnecessary and an issuing time of a portable storage medium can be shortened.

In the first embodiment it has been explained that the keys 1 through 4 have been stored in the auxiliary memory 14 of the host computer 11 but these keys may be stored in key cards.

Further, in the first embodiment the IC card 17 stores definition data a1 to an comprising addresses, sizes, etc. of the storing regions 40(1) to 40(n) and directory data 41(1) to 41(n) comprising key collating conditions b1 to bn for recording/reading data to/from storing regions defined by these definition data and keys corresponding to independent data storing regions 40(1) to 40(n) for each service of the data memory 20.

Accordingly, it becomes possible for each service organization to perform the control independently when issuing cards by recording only directory data and keys corresponding to the storing regions to which own service is provided on cards in advance.

Next, a second embodiment of the present invention will be explained.

Figure 10:
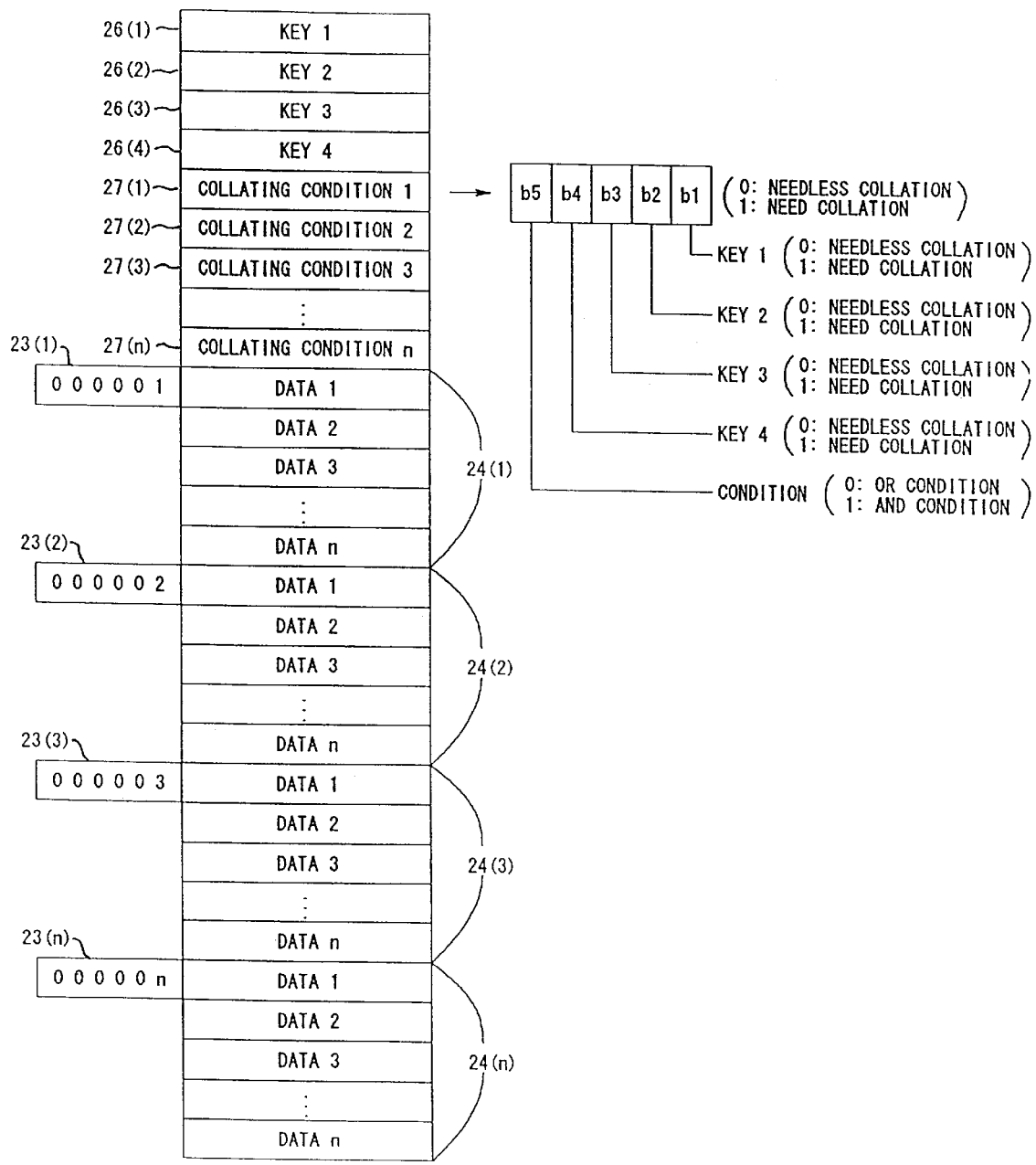
FIG. 10 is a memory map showing the construction of the issuing data file in a second embodiment.

In the second embodiment, an issuing data file in a format shown in FIG. 10 is stored in the auxiliary memory 14 and keys 1 to 4 (26(1) to 26(4)) are provided as conditions for writing issuing data on IC cards.

The format shown in FIG. 10 differs from the issuing data file format shown in FIG. 2 in the contents of the collating conditions 27(1) to 27(n).

That is, the low order first bit (b1) through the low order fourth bit (b4) of the data of collating conditions show whether the collation with corresponding keys is required or not. The low order fifth bit (b5) shows whether any key requiring the collation has been collated (OR condition) or all keys requiring the collation have been collated (AND condition).

If the low order fifth bit (b5) is "0", it shows that it is all right (OR condition) if any one of the keys requiring the collation at the low order first bit (b1) through the low order fourth bit (b4) was collated.

If the low order fifth bit (b5) is "1", it shows that all the keys requiring the collation at the low order first bit (b1) through the low order fourth bit (b4) must have been collated.

The operations of the second embodiment when the collating conditions described above have been set will be explained based on FIGS. 5, 6D, 6E and 10 through 14B.

First, the operations from the energizing of this system (STEP 601) to the setting of 1 on the data count flag "i" (STEP 613) are the same as the first embodiment and therefore, the explanation will be omitted. Then, when "data 1" which is an issuing data belonging to the starting card number, for instance, "000001" is sent to the CPU 21 of the IC card 17 through the IC card reader/writer 18 for writing into the data memory 20 by the CPU 21 as shown in FIG. 10, the host computer 11 first resets the collating conditions stored in the main memory 13 (STEP 626).

Then, it is confirmed that the collating condition 27(1) for writing the data 1 into the data memory 20 by the CPU 21 has been satisfied.

That is, the collating condition 27(1) required for writing the issuing data 1 in the storing region 1 (40(1)) in the IC card 17 is the collated status of the OR condition wherein one of the keys 1, 2 and 4 has been already collated as shown in FIG. 11A.

When the current key collated status stored in the main memory 13 is that status wherein the keys 1 and 2 have been collated as shown in FIG. 11B, it is judged that the condition for writing the issuing data 1 has been satisfied as the keys 1 and 2 have been already collated (STEP 627), and the issuing data 1 is written in the storing region 1 (40(1)) without executing the key collating process (STEP 628).

After writing "Issuing Data 1" in the data memory 20, the host computer checks whether all data (data 1 to data n) have been written (STEP 629). If not, the host computer 11 updates the data count flag "i" (STEP 630) and performs the similar writing process until the writing of all data is completed.

That is, after recording the issuing data 1 on the IC card 17, the data count flag "i" is updated to "2" according to "i=i+1" and the writing of the issuing data 2 starts.

Then, the collating condition 27(2) required for writing the issuing data 2 in the storing region 2 (40(2)) is the collating status of OR condition wherein either the key 2 or key 3 has been already collated as shown in FIG. 12A.

When the current collated status stored in the main memory 13 is the status wherein the keys 1 and 2 have been collated as shown in FIG. 12B, it is judged that the condition required for writing the issuing data 2 has been satisfied as the key 2 has been already collated (STEP 627). Accordingly, the issuing data 2 is written in the storing region 2 (40(2)) without executing the key collating process (STEP 628).

Further, the collating condition 26(3) required for writing the issuing data 3 in the storing region 3 (40(3)) is the collating status of OR condition wherein either key 3 or key 4 has been already collated as shown in FIG. 13A.

When the current collated status stored in the main memory 13 is the status wherein the keys 1 sand 2 have been collated as shown in FIG. 13B, it is judged that the condition for writing the issuing data 3 has not been satisfied as both the keys 3 and 4 have not been collated (STEP 627). To satisfy the condition for writing the issuing data 3, the key 3 or the key 4 stored in the auxiliary memory 14 is read and input to the IC card 17. After collating this key 3 or key 4, the result of collation stored in the RAM 22 and the main memory 13 is updated (STEP 631).

As a result of the collation of the key 3 or the key 4, if either the key 3 or 4 agreed with the secret data, the condition for writing the issuing data 3 is satisfied and the issuing data 3 is written in the storing region 3 (40(3)) (STEP 628).

Then, the collating condition 26(n) required for writing the issuing data n in the storing region (540(n)) is the collated status of AND condition wherein both the keys 1 and 3 have been already collated as shown in FIG. 14A.

The current collated status stored in the main memory 13 is the status wherein the keys 1, 2 and 4 have been collated as shown in FIG. 14B, it is judged that the collating condition for writing the issuing data n has not been satisfied as the key 3 has not been collated (STEP 627).

Accordingly, all the key collated status are reset to the not collated status, and the key 3 stored in the auxiliary memory 14 is read and input to the IC card 17. In the IC card 17 the key 3 is collated and the result of collation stored in the RAM 22 and the main memory 13 is updated (STEP 631).

If the secret data is agreed with as a result of the collation of the key 3, the condition for writing the issuing data n has been satisfied, and the issuing data n is written in the storing region n (40(n)) (STEP 628).

When the writing of all data belonging to the start card number is completed by the operations described above, the host computer 11 sends a card discharging command to the IC card reader/writer 18 to discharge the IC card 17 (STEP 622). Thereafter, the IC card 17 is issued in the number of cards to be issued likewise the first embodiment.

As described above, in the second embodiment, in the data for the collating condition, the low order fifth bit (b5) is set to indicate whether any one of the keys requiring the collation should have been collated (OR condition) or all of the keys requiring the collation should have been collated (AND condition).

Therefore, the protection of issuing IC cards and writing issuing data in IC cards can be set flexibly. Further, when entrusting the IC card issuing, collating conditions can be changed easily only by changing the key collating condition from the AND condition to the OR condition.

As described above in detail, according to the present invention, it is possible to prevent illegal issue of IC cards while retaining independent secrecy for each issuing data as collating conditions of secret data for writing issuing data in a portable storage medium corresponding to each of issuing data and the collated status with the collating conditions is checked.

Further, it is also possible to prevent the illegal card issue on the IC card itself as the secret data collating condition for writing issuing data in a portable storage medium is set corresponding to each of the storing regions in a portable storage medium, the collating condition and the collated status are checked when issuing cards and the writing is protected independently by each storing region in a portable storage medium.

Furthermore, if the collated status required for the writing is kept by retaining the collating condition and the collated status by the IC card issuing system, the recollation becomes unnecessary and a time for issuing a portable storage medium can be shortened.

What is claimed is:

1. A portable storage medium issuing system for writing plural issuing data into storing regions of a portable storage medium, comprising:

means for storing plural secret data;

first collating means for collating input secret data with the secret data stored in the storing means;

collated result storage means for storing which secret data of plural secret data has been collated and agreed with secrete data stored in the storage means based on the collating result of the first collating means;

collating condition storage means for storing plural issuing data and conditions of secret data, which are set corresponding to each of the plural issuing data and require the collation before writing into the portable storage medium, as collating conditions;

comparing means for comparing the collating conditions stored in the collating condition storage means with the collated status stored in the collated result storage means; and writing means for writing issuing data in which this collating conditions are set in storing regions in the portable storage means when the collated status satisfies the collating conditions based on the result of comparison of the comparing means.

2. A portable storage medium issuing system as claimed in claim 1, further comprising:

second collating means for collating secret data if the secret data of which collation is required by the collating condition has not yet been collated as a result of the comparison by the comparing means; and updating means for updating the collated status according to the result of collation by the second collating means;

wherein the writing means writes the issuing data after the collated status satisfies the collating condition.

3. A portable storage medium issuing system as claimed in claim 1, further comprising:

erasing means for erasing the result of collation stored in the collated result storage means when secret data other than those requiring the collation by the collating condition were collated as a result of the comparison by the comparing means;

wherein the writing means writes the issuing data after the secret data requiring the collation are collated by the collating condition storage means and the collated status satisfies the collating condition.

4. A portable storage medium which has plural storing regions in which plural issuing data are written, comprising:

storage means for storing plural secret data;

collating means for collating input secret data with the secret data stored in the storage means;

collated result storage means for storing which secret data out of plural secret data has been collated and agreed based on the result of collation of the collating means;

collating condition storage means for storing secret data condition which has been set corresponding to each of the plural storing regions and requires the collation before writing issuing data into the storing region as the collating condition;

comparing means for comparing the collating condition stored in the collating condition storage means with the collated status stored in the collated result storage means; and writing means for writing issuing data supplied from an issuing system into a storing region wherein the collating condition has been set when the collated status satisfies the collating condition based on the result of comparison of the comparing means.

5. A portable storage medium as claimed in claim 4, further comprising erasing means for erasing the result of collation stored in the collated result storage means if secret data other than those requiring the collation has been collated by the collating condition as a result of the comparison by the comparing means.

6. A portable storage medium issuing method for writing plural issuing data into storing regions of a portable storage medium, comprising:

first step of storing plural secret data in a storage means;

second step of collating input secrete data with the secret data stored in the storage means;

third step of storing secrete data out of plural secret data that has been collated and agreed based on the collated result by the second step;

fourth step of storing the secret data condition which has been set corresponding to each of plural issuing data and requires the collation before writing into the portable storage medium as the collating condition;

fifth step of comparing the collating condition stored in the fourth step with the collated status stored in the third step; and sixth step of writing the issuing data with the collating condition set in the storing regions in the portable storage medium when the collated status satisfies the collating condition based on the result of comparison in the fifth step.

7. A portable storage medium issuing method as claimed in claim 6, further comprising:

seventh step of collating secret data if the secret data requiring the collation with the collating condition has not been collated as a result of the comparison in the fifth step; and eighth step of updating the collated status based on the collated result in the seventh step;

wherein the sixth step executes after the collated status has satisfied the collating condition.

8. A portable storage medium issuing method as claimed in claim 6, further comprising:

ninth step of erasing the collated result stored in the third step if secret data other than those requiring the collation has been collated by the collating condition as a result of comparison in the fifth step;

wherein the sixth step executes after the secret data requiring the collation in the fourth step has been collated and the collated status satisfies the collating condition.

* * * * *